United States Patent Office 2,817,633
Patented Dec. 24, 1957

2,817,633

SIDE-CHAIN HALOGENATION OF AROMATIC COMPOUNDS

Rowland H. Mayor, Cuyahoga Falls, Ohio, assignor to The Goodyear Tire & Rubber Company, Akron, Ohio, a corporation of Ohio No Drawing. Application September 30, 1954
Serial No. 459,541

9 Claims. (Cl. 204—163)

This invention relates to the halogenation of aromatic compounds containing one or more aliphatic side-chains. More particularly this invention relates to a method of halogenating such materials by which nuclear substitution is minimized or completely inhibited and halogenation occurs substantially completely in the aliphatic side-chain even though the halogenation is carried out in the presence of halogen-carriers which normally cause nuclear substitution.

The selective side-chain halogenation of araliphatic materials such as toluene or xylene is a well-known general procedure. Usually this type of reaction is carried out in glass apparatus in the presence of light, but in the absence of metallic ions. However, if a "halogen-carrier" such as iron is present, the mixture quickly becomes black and chlorine absorption is slowed down or completely prevented. In addition to discoloration, tar formation, nuclear substitution and other undesirable effects are obtained when the halogenation is carried out in the presence of iron, or iron compounds, or other "halogen-carriers."

It is an object of this invention to provide a method of preventing the discoloration of aliphatic-substituted aromatic compounds in the side-chain halogenation of such compounds even though a metal "halogen-carrier," such as iron, be present.

Another object of this invention is to provide a catalyst which directs substitution to the aliphatic side-chain of aliphatic-substituted aromatic compounds during the course of halogenation reactions and which substantially prevents nuclear substitution.

Still another object of this invention is to provide a method of halogenating aliphatic-substituted aromatic compounds in the presence of iron, or in iron equipment, in which substitution of the halogen takes place substantially completely in the aliphatic side-chains.

Another object of this invention is to provide a catalyst which inhibits the deleterious effect of iron and its compounds.

It has unexpectedly been found that, in halogenation reactions, organo phosphites and amines have a synergistic action so that the two kinds of materials, when present at the same time, have a very great inhibiting effect on metal halogen-carriers such as iron and its compounds.

Thus, according to this invention, aliphatic-substituted aromatic compounds can be halogenated in the presence of light and in the presence of an organic phosphite and an amine to give products in which the halogenation is effected substantially completely in the side-chains and nuclear halogenation is minimized or completely prevented even though a metal "halogen-carrier," such as iron or iron compounds, be present.

The practice and efficacy of the invention are illustrated by the following examples:

Example 1

A one-liter, three-neck flask was equipped with a stirrer made of iron wire, a chlorine inlet tube and a condenser. Two hundred grams of metaxylene were added to the flask. One milliliter of Mark XX (a commercial product sold by Argus Chemical Corporation and identified as a trialkylaryl phosphite of the type listed in U. S. Patent No. 2,564,646) was added to the metaxylene. The charge was heated to a temperature of 125 to 150° C. and the temperature was maintained in this range while chlorine was bubbled into the charge as rapidly as it could be absorbed, the materials being agitated by the stirrer while the chlorine was being passed in. During the chlorination the mixture was illuminated with a 150-watt light. The mixture turned dark brown, and chlorine absorption stopped at about two hours.

Example 2

Two hundred grams of metaxylene were chlorinated under conditions similar to that of Example 1 except that 0.2 gram of urea were added to the metaxylene as a discoloration and nuclear substitution inhibitor. The mixture turned brown in four hours and chlorine absorption stopped.

Example 3

Two hundred grams of metaxylene containing 0.2 gram of urea and 1.0 milliliter of Mark XX were chlorinated under conditions similar to that of Example 1. At 13 hours the mixture was reddish brown in color and 55.7% of the theoretical amount of chlorine had been absorbed.

When such a chlorination is carried out in the presence of iron, but without the phosphite-amine catalyst, the mixture changes color from orange to brown and at the end of two hours is nearly black. Chlorine absorption stops at the dark brown stage.

The organic phosphite and amine together have a synergistic action and they minimize darkening of the reaction mixture, inhibit nuclear substitution and permit the side-chain halogenation to proceed practically to completion. Thus the invention provides a method of carrying out side-chain halogenation of aliphatic-substituted aromatic hydrocarbons under conditions which normally induce nuclear halogenation. By the method of this invention nuclear halogation is inhibited and the production of side-chain halogenated products can be more readily carried out on a commercial scale even in the presence of iron or using iron equipment.

The phosphite:amine ratio is not critical but can be varied over a wide range. Generally a ratio of phosphite to amine in the range of from 1 to 10 parts by weight of phosphite to 1 part by weight of amine is used, but other ratios can be used if desired.

The amount of the synergistic mixture used can be varied over a wide range. As little as 0.1% based on the weight of the aliphatic-substituted aromatic compound can be used, but usually the amount needed will be from 0.2 to 10%.

The amount of the organic phosphite and amine required for protection against the deleterious effects of a "halogen-carrier" is dependent upon the amount and the form of the "halogen-carrier." For example, soluble iron compounds or finely-divided iron powder require more of the phosphite-amine mixture for successful side-chain halogenation than does a single large piece of iron metal.

The examples show the use of an alkylaryl phosphite as one part of the synergistic combination. Other organic phosphites, including aryl, aralkyl and other alkylaryl phosphites as well as alkyl and cycloalkyl phosphites, can be used. The phosphites can be mono- and di-organo phosphites as well as tri-organo phosphites. Representative examples of such phosphites are tri-butyl phosphite, tri-octyl phosphite, tri-dodecyl phosphite, tri-cresyl phosphite, tri-phenyl phosphite, phenyl ethyl phosphite, butyl di-phenyl phosphite, di-butyl phenyl phosphite, buytl di-cresyl phosphite, di-butyl cresyl phosphite, di-butyl phosphite, di-octyl phosphite, di-phenyl phosphite, di-cyclohexyl phosphite, mono-amyl phosphite and mono-octyl phosphite.

The invention has been particularly illustrated with respect to the use of urea. Various other amines can also be used. Examples of such amines are hexamethylene tetramine, guanidine, ethylene diamine, diethylene triamine, triethylene tetramine, tetraethylene pentamine, pyridine, quinoline, alpha-picoline, acetamide and thiourea.

The invention has also been particularly illustrated with respect to chlorination, but it can be used in bromination reactions also. The side-chain halogenation of aliphatic-substituted aromatic compounds can be readily accomplished by the method of this invention and it is a method of general application for the side-chain halogenation of aliphatic-substituted aromatic compounds.

The above examples illustrate the invention for halogenation reactions carried out in the presence of iron and iron compounds. It is also applicable to halogenation reactions in which other materials which catalyze or promote nuclear halogenation are present. Examples of other such materials with which the invention is effective are "halogen-carriers" such as aluminum trichloride, antimony trichloride and, in general, the trivalent metal ions and other catalysts which are well known in the art.

While certain representative embodiments and details have been shown for the purpose of illustrating the invention, it will be apparent to those skilled in this art that various changes and modifications may be made therein without departing from the spirit or scope of the invention.

I claim:

1. A process for effecting side-chain halogenation of an aromatic hydrocarbon compound containing aliphatic side-chains in the presence of a material which catalyzes nuclear halogenation and in the presence of light, which comprises heating and reacting said aromatic compound with a halogen selected from the group consisting of chlorine and bromine in the presence of a mixture of (a) an organic phosphite ester selected from the group consisting of aryl, aralkyl, alkaryl, alkyl and cycloalkyl phosphite esters and (b) an amine.

2. A process for effecting side-chain halogenation of an aromatic hydrocarbon compound containing aliphatic side chains in the presence of a material which catalyzes nuclear halogenation and in the presence of light, which comprises heating and reacting said aromatic compound with a halogen selected from the group consisting of chlorine and bromine in the presence of a mixture of (a) an organic phosphite ester selected from the group consisting of aryl, aralkyl, alkaryl, alkyl and cycloalkyl phosphite esters and (b) a compound selected from the group consisting of urea, hexamethylene tetramine, guanidine, ethylene diamine, diethylene triamine, triethylene tetramine, tetraethylene pentamine, pyridine, quinoline, alphapicoline, acetamide and thiourea.

3. A process for effecting side-chain chlorination of an aromatic hydrocarbon compound containing aliphatic side chains in the presence of a material which catalyzes nuclear halogenation and in the presence of light, which comprises heating and reacting said aromatic compound with chlorine in the presence of a mixture of (a) an organic phosphite ester selected from the group consisting of aryl, alkaryl, alkyl and cycloalkyl phosphite esters and (b) an amine.

4. A process for effecting side-chain bromination of an aromatic hydrocarbon compound containing aliphatic side chains in the presence of a material which catalyzes nuclear halogenation and in the presence of light, which comprises heating and reacting said aromatic compound with bromine in the presence of a mixture of (a) an organic phosphite ester selected from the group consisting of aryl, aralkyl, alkaryl, alkyl and cycloalkyl phosphite esters and (b) an amine.

5. A process for effecting the side-chain chlorination of a xylene in the presence of a material which catalyzes nuclear halogenation and in the presence of light, which comprises heating and reacting said xylene with chlorine in the presence of a mixture of (a) an organic phosphite ester selected from the group consisting of aryl, aralkyl, alkaryl, alkyl and cycloalkyl phosphite esters and (b) an amine.

6. A process according to claim 5 in which the xylene is orthoxylene.

7. A process according to claim 5 in which the xylene is metaxylene.

8. A process according to claim 5 in which the xylene is paraxylene.

9. A process for the side-chain chlorination of a xylene which comprises heating and reacting said xylene with chlorine in the presence of a material which catalyzes nuclear halogenation and in the presence of light at a temperature of 125–150° C. in the presence of from 0.1 to 10% by weight of said xylene of a mixture of a trialkaryl phosphite ester and a compound selected from the group consisting of urea, hexamethylene tetramine, guanidine, ethylene diamine, diethylene triamine, triethylene tetramine, tetraethylene pentamine, pyridine, quinoline, alphapicoline, acetamide and thiourea.

References Cited in the file of this patent
UNITED STATES PATENTS 2,430,822    Nevison _____ Nov. 11, 1947